United States Patent [19]

Morvant

[11] Patent Number: 5,165,703
[45] Date of Patent: Nov. 24, 1992

[54] ANTI-EXTRUSION CENTERING SEALS AND PACKINGS

[75] Inventor: John D. Morvant, Houston, Tex.

[73] Assignee: OEM Components, Inc., Houston, Tex.

[21] Appl. No.: 672,675

[22] Filed: Mar. 20, 1991

[51] Int. Cl.⁵ .................... P16J 15/10; E21B 33/128
[52] U.S. Cl. ................. 277/188 A; 277/229; 277/230; 277/235 R; 277/235 A
[58] Field of Search .......... 277/116.2, 116.8, 119–125, 277/188 R, 188 A, 230, 235 R, 235 A, 206 R, DIG. 6, 227, 229

[56] References Cited

U.S. PATENT DOCUMENTS

| | | | |
|---|---|---|---|
| 1,931,922 | 10/1933 | Damsel et al. | 277/206 R |
| 1,991,715 | 2/1935 | Wheeler | 277/124 |
| 2,400,533 | 5/1946 | Buffington | 277/188 R |
| 2,762,640 | 9/1956 | Horvath | 277/124 |
| 2,826,254 | 3/1958 | O'Neill | 277/206 R X |
| 4,139,204 | 2/1979 | Howe | 277/123 |
| 4,227,573 | 10/1980 | Pearce et al. | 277/235 R X |
| 4,296,806 | 10/1981 | Taylor et al. | 277/235 R X |
| 4,326,588 | 4/1982 | McStravick | 277/188 A X |
| 4,428,592 | 1/1984 | Shaffer | 277/230 |
| 4,462,603 | 7/1984 | Usher et al. | 277/230 |
| 4,463,959 | 8/1984 | Usher et al. | 277/230 |
| 4,524,982 | 6/1985 | Hertz, Jr. | 277/230 X |
| 4,549,741 | 10/1985 | Usher et al. | 277/206 R X |
| 4,611,658 | 9/1986 | Salerni et al. | 277/188 A X |
| 4,730,835 | 3/1988 | Wilcox et al. | 277/188 A X |
| 4,753,444 | 6/1988 | Jackson et al. | 277/230 |
| 4,862,967 | 9/1989 | Harris | 277/DIG. 6 X |

*Primary Examiner*—William A. Cuchlinski, Jr.
*Assistant Examiner*—Scott W. Cummings

[57] ABSTRACT

A sealing system is disclosed that includes an elastomer or other resilient seal material for a center ring bounded by a pair of mesh rings coated with a flexible material. Alternatively, a sealing system is disclosed that uses a plurality of mesh rings, each of the rings being coated with a flexible material.

38 Claims, 6 Drawing Sheets

ANTI-EXTRUSION CENTERING SEALS AND PACKINGS

BACKGROUND OF THE INVENTION

1. Field of the Invention

The present invention relates to sealing devices and, more particularly, to seals, packings and the like used in environments wherein at least a portion of the sealing device is subjected to extrusion forces. Typically such forces are experienced by down hole oil tools. For example, in the application of a down hole packer, the area between the oil tool and the well casing is sealed.

2. Description of the Prior Art

Sealing devices, such as seals or packings, whether of the dynamic or static type, are usually made, or have portions made of materials which, to some extent, are resilient or at least deformable. In order to seal effectively, it is usually necessary that the sealing device be placed under some compressive loading between the components of the assembly to be sealed. Because of the compressive load and the deformable nature of at least a portion of the seal, if the seal is subjected to sufficient pressure, there is a tendency for portions of the seal to be subjected to extrusion forces which will either distort the seal and impair its effectiveness as a seal or, in more severe cases, force portions of the seal into clearances between the components to be sealed.

In an attempt to overcome this extrusion problem, workers in the field have resorted to various techniques. One common practice employed to prevent such extrusion as, for example in a seal ring or packing used between relatively reciprocating or rotating parts, is to mount separate back-up rings or washes adjacent a set of seal ring, the back-up rings serving to prevent the outer seal rings from being extruded. These back-up rings are generally made of metal or other hard materials which generally must be machined or are made of bare metal mesh. Another technique which has been used is shown in U.S. Pat. No. 3,094,337 wherein there are disclosed anti-extrusion seal rings in which an annulus of a relatively soft sealing material is bonded to annular sections of anti-extrusion materials such as thermosetting resins or the like.

SUMMARY OF THE INVENTION

The object of the present invention is to provide an improvement to a well tool such as a well packer, bridge plug, or other sealing means which is adaptable for insertion in a conduit within a subterranean well.

The present invention improves the performance of the well tool by reducing the required axial compressive force required to energize the sealing body. Furthermore the present invention provides enhanced centralizing of the well tool within the conduit resulting in a uniform annulus.

Another improvement of the present invention is elimination of premature seal energizing. Non-extrusion rings of prior art are prone to failure due to dimensional changes during handling, stress relaxation during storage, and rapid insertion into a well bore. The present invention does not fail because of the processes and materials used in the manufacture of the seal ring. The present invention possesses back-up rings of greater rigidity than the prior art. Also, a portion of the present invention is the ring being fluid resistant during down hole travelling eliminating swab off problems.

Because of the nature of the ring design, the improved ring or packing may be used under severe operating conditions including, for example, high pressures, high temperatures and the like. The improved sealing device uses a seal ring, packing or the like incorporating anti-extrusion sections or elements formed of knitted or comparable materials with a high density incorporating at least some metallic component.

The sealing device of the present invention, in one embodiment, comprises a generally non-metallic body section. Contiguous to the body section are two anti-extrusion sections or elements formed primarily from knitted materials made from interlocked filaments or wires, at least some of which are metallic in nature. The anti-extrusion elements are each coated with elastomer to enhance its physical strength, rigidity and handleability and prevent permeability. The shape of the seal includes large extensions for extrusion prevention which extensions are activated by the side of the ring in conjunction with the body. Alternatively to avoid movement, a special hinge section may be used for the ring.

The above and other objects of the present invention will become apparent from the drawings, the description given herein and the appended claims.

BRIEF DESCRIPTION OF THE DRAWINGS

For a further understanding of the nature and objects of the present invention, reference should be made to the drawings in which like parts are given like reference numerals and wherein.

DESCRIPTION OF THE PREFERRED EMBODIMENTS

Figure 1:
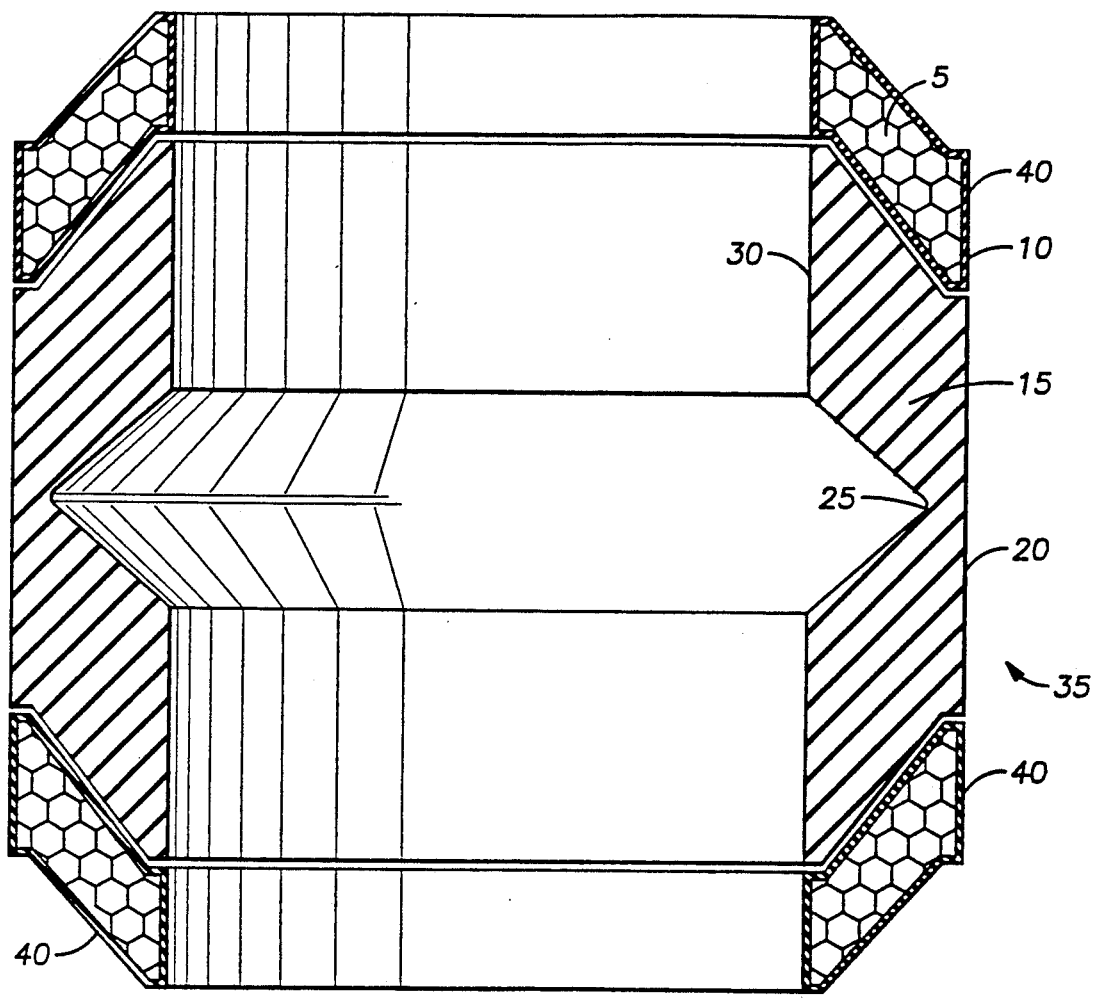
FIG. 1 is a cross-sectional view of the seal array of the preferred embodiment of the present invention as assembled for application.

Referring first to FIG. 1, there is shown the seal array 7. The array is generally, but not limited to, three elements whereas the prior art uses a center ring of 70 Durometer, two side rings of 90 Durometer and two metal mesh back-up rings in order to lower setting forces. Two of the elements are resilient coated non-extrusion rings 40, each of which includes a die formed wire mesh ring 5 and a molded coating 10 preferably of elastomer 15 but alternatively of plastic, malleable metal or other resilient material. The two extrusion rings 40 sandwich a seal body 35, which is preferably made of a deformable, resilient seal material 15 such as an elastomer, like rubber.

The preferred geometry of the seal body 35 includes a groove 25, V-shaped in cross-section, forming legs 27. Groove 25 acts as a hinge location so that axial compression on the seal body 35 will fold and expand seal body 35 (see FIG. 2). Such an expansion changes movement of the outside sealing surface 20 and also causes an inside seal surface 30 to maintain sealing contact with an internal sealing surface, such as the sealing surface 140 of a mandrel or tool 125. Seal body 35 further includes upper and lower surfaces 92 for activating the seal array 7.

Figure 5:
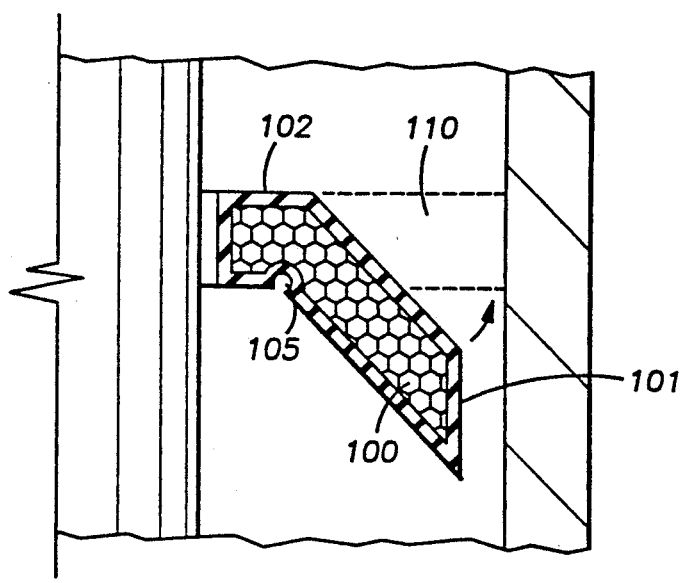
FIG. 5 is a partial view, partly in cross-section, of the non-extrusion seal ring in the relaxed and activated position to begin sealing in a sealing environment, indicating motion of the non-extrusion ring folding out to a seal surface.
Figure 2:
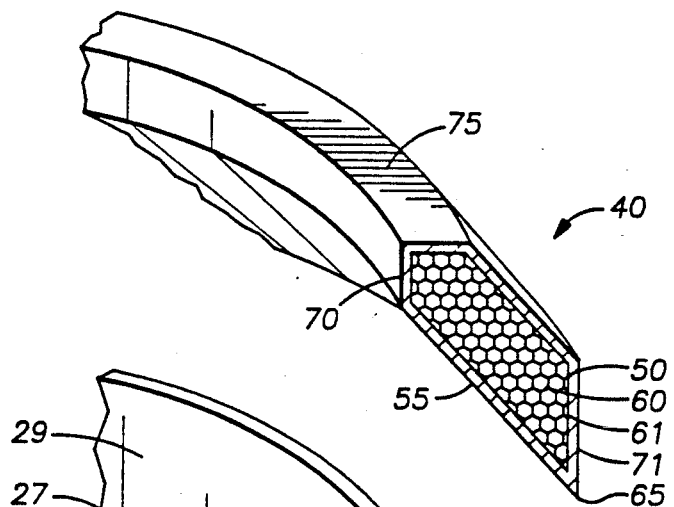
FIG. 2 is a partial view, partly in cross-section, of the elastomer coated non-extrusion ring.

As shown in FIG. 2, elastomer coated, non-extrusion ring 40 that is positioned on either side of seal body 35 includes a die formed ring 50 of wire mesh 60, preferably metal, having for example a density of 50% of the metal density, and ranging in density between 48% and 52% preferably. Rings 40 are comprised preferably of a metal wire mesh material having interlocking loops. A coating 10, preferably an elastomer rated for the down hole environment of a well tool, is chemically and mechanically bonded to the surface 61 of the die formed wire mesh 60. This process increases rigidity of the non-extrusion ring 50 and is believed to do this because the resilient coating prevents the metal wire mesh ring from being stress relaxed. Also, the wire mesh 60 is sealed by the elastomer 55 from well bore fluids which would otherwise penetrate the wire mesh 60 and cause dimensional changes, and the element would swab off. The ring 50 has an outer, canted edge 65 which is dimensioned to be forced to a larger diameter during axial compression of the ring 40 (FIG. 5, 7). Ring 40 further includes a substantially flat surface 75 dimensioned to permit a distributed axial load to be applied. Ring 40 also includes a curvilinear surface 55 having a surface form that matches upper and lower surfaces 92 of seal body 35. Vertical surface 70 dimensioned to permit contact with a sealing surface such as the sealing surface 140 of support mandrel 125.

In application, surface 55 of each of the rings 40 comes into contact with surface 92 of the seal body 35. Forces from compression of surfaces 75 of rings 40 are transmitted to surfaces 55 which among other actions cause edges 65 to increase in diameter, bridging the annulus 155, such as between a well tool 125 and a well casing 120.

Figure 3:
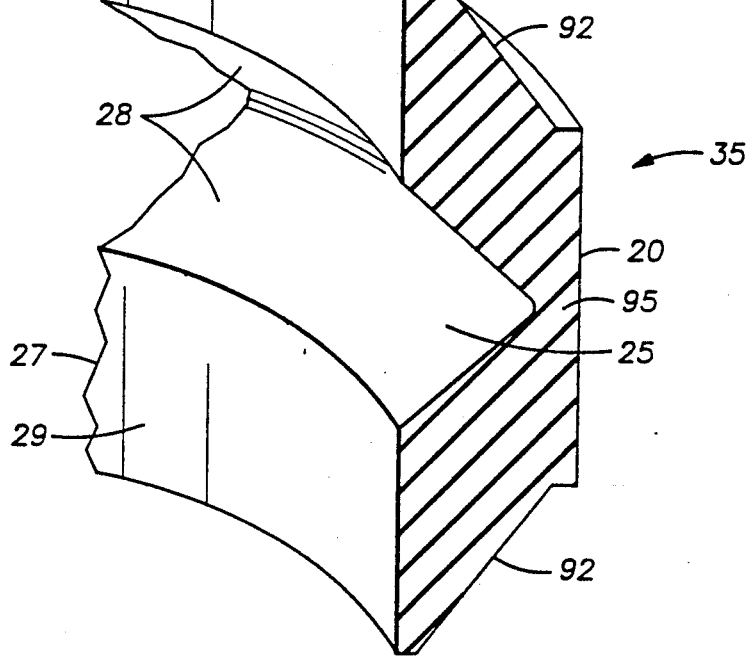
FIG. 3 is a partial view, partly in cross-section, of the elastomer seal body.

FIG. 3 further details the seal body 35 having an elastomeric seal body 80 for use in sealing an annulus, such as annulus 155. Seal body 35 has a primary sealing surface 20, designed to expand outward to a well casing wall, such as 135 when a distributed axial load is applied from surface 55 of ring 40 to surface 92 of seal body 35. Compressive stresses transmitted through the seal body 35 are however limited by groove or channel 25 to passing through narrow area 95. Because of channel 25 in the inside surface 26 of the seal body 35, the legs 27 of seal body 35 will collapse and hinge in area 95 causing inner surfaces 28 of legs 27 to meet. The collapsing and hinging of the body 35 will cause expansion outwardly of surface 20. Upon contact with the inner surface 135 of outer wall 120 of annulus 155, such as the outer surface of a well casing, the stresses on surface 20 and will bases 29 of legs 27 increase creating a barrier to axial flow of fluid through the annulus 155.

Figure 4:
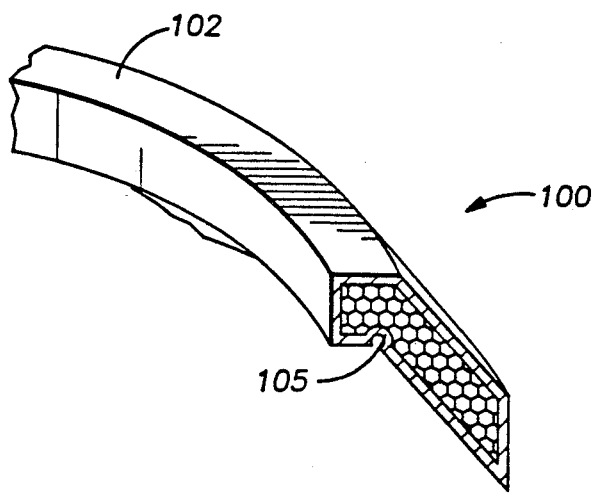
FIG. 4 is a partial view, partly in cross-section, of a non-extrusion ring with a hinge area.

Referring to FIGS. 4 and 5, there is shown an elastomer coated non-extrusion ring 100 of an alternate preferred geometry. Ring 40 has no specified hinge point based on its configuration. Hence the hinge point for ring 20 will be somewhere along the surface 70 as edge 65 rotates. This will cause surface 70 to move along the surface 140 as the seal array 7 sets. This movement is not always desirable. Accordingly, structurally specifying on hinge point may be desirable in applications. Ring 100 is substantially identical to ring 40 except for a reduced cross-sectional thickness 105 of the wire mesh which yields a pronounced hinge point at the reduced cross-section 105. The hinge 105 is dimensioned to increase flexibility.

As shown in FIG. 5, upon application of axial load 145 to the surface 102 of ring 100 the outside edge 101 of the ring 100 will relocate to the desired position 110, around hinge point 105. Ring 100 may be used substantially in all cases in place of ring 40, and applications shown herein using ring 40 could have ring 100 Substituted in their place within the scope of this invention.

Figure 6:
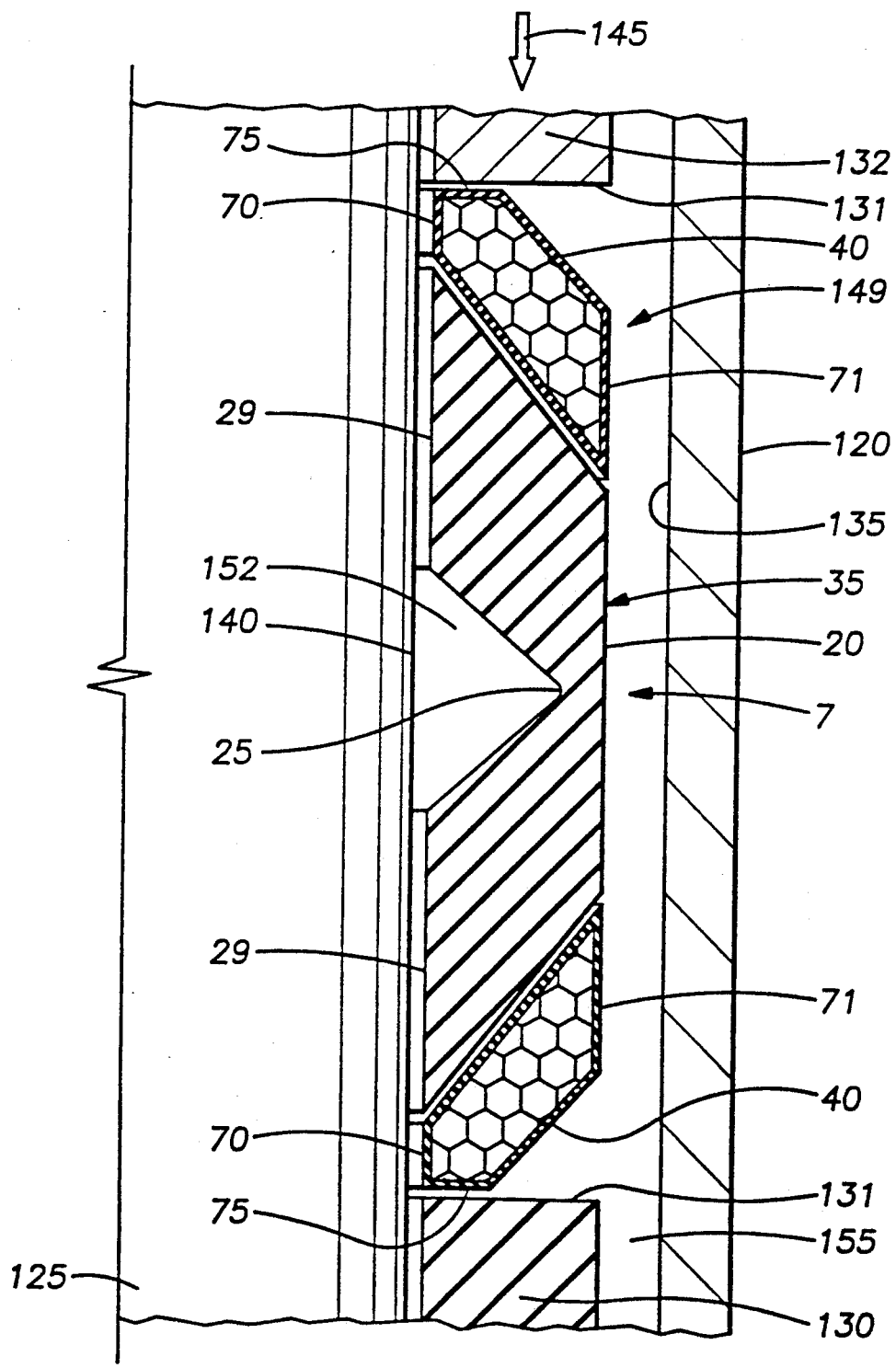
FIG. 6 is a partial view, partly in cross-section, of the seal array in a simplified environmental view showing a non-extrusion ring and seal body array assembled on a mandrel and inside a well casing.

Referring to FIG. 6, there is shown a partly sectional view of a well packer 149 located in an annulus 155 in a well casing 120. The annulus 155 is described as the space between the well tool mandrel 125 and the casing 120. The seal array 7 is supported in the annulus 155 by the well tool mandrel 125 and has contact with the mandrel outer surface 140 with bases 29 of seal body 35 and surface 70 of rings 40. The seal array 7 is contacted at each end 75 of rings 40 by the surface 131 of gage rings 130, 132. In the unenergized state the upper gage ring 132 applies no force (shown by directional arrow) 145 to the seal array 7.

Figure 7:
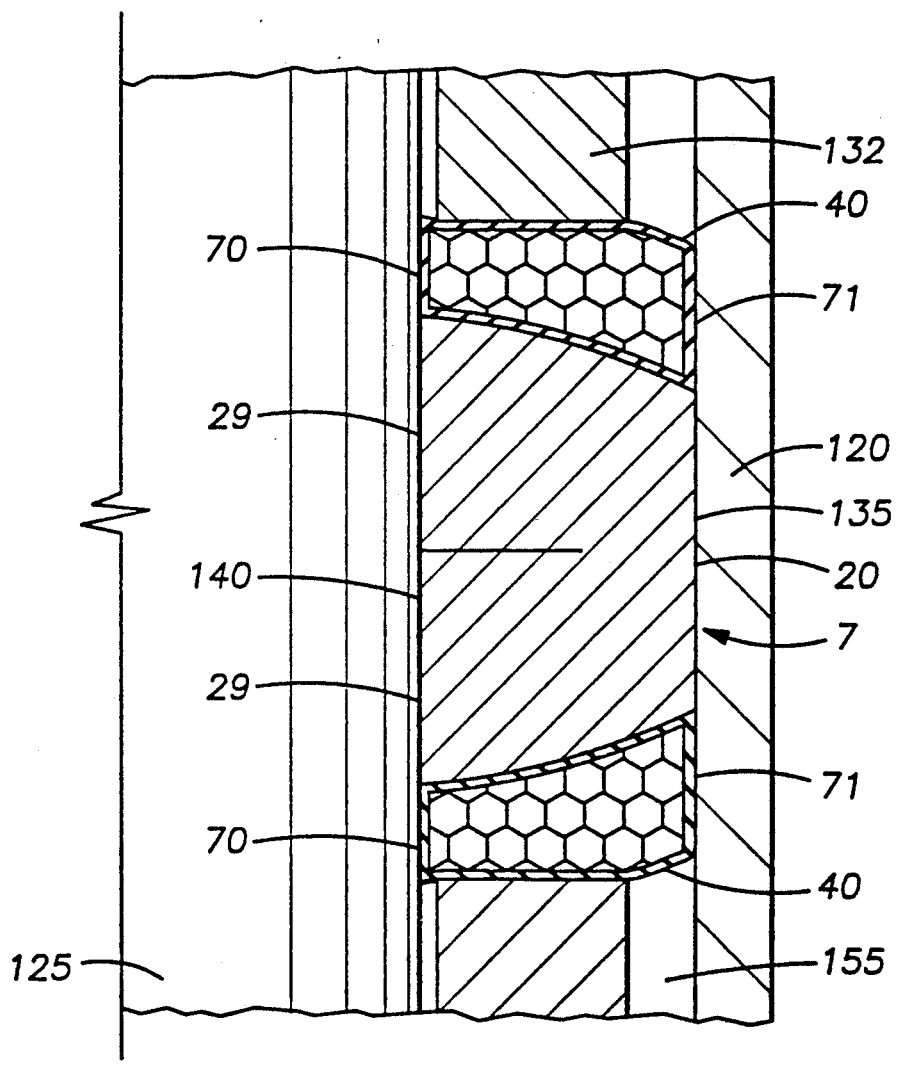
FIG. 7 is a similar view to FIG. 6 showing the array compressed and expanded to the well casing.

As shown in FIG. 7, the seal is energized by forcing gage ring 132 with a force 145 sufficient to fold the seal array 7. Seal array 7 collapses as force is transmitted from surfaces 75 to surfaces 92. Force on surfaces 92 cause legs 27 to rotate substantially about an axis in portion 95 until inner surfaces 28 of legs 27 contact. This rotation also causes a portion of surfaces 92 to act outwardly against surface 55, forcing surfaces 71 and outer edges 65 of rings 40 to rotate outwardly. This increases the diameter of each outer control edge 65 and surfaces 71 until contact of surface 20 with the casing wall 135 is achieved. The provision of a volume 152 by groove 25 allows the seal body 35 to be folded with minimal setting force 145 and friction drag on the mandrel surface 140.

FIG. 7 shows the formation of the seal array 7 after contact is made with the casing wall 135. When sufficient axial force is applied to the seal array 7, stresses develop between the seal body 35 and the casing wall 135. Seals are formed by surface 135 with surface 20 and by surface 140 with surfaces 29. Optimally the developed stresses are uniform throughout the seal body 35.

With regard to seal activation, uniform stresses are developed in the elastomer portion seal body 35 of the array 7. This avoids stress concentration points which cause fatigue failure and are inefficient distributions of the force. The high uniform stresses will prevent or at least reduce gas permeation within the elastomer. Gas permeation causes explosive decompression of elastomer and the effect is failure.

Further, compression of the array 7 causes the mesh ring 40 to expand out and contact the casing wall 135 before stress builds up between the mesh ring 40 and the well tool 125. The result is reduced friction between the mesh ring 40 and the well tool 125 during compression.

Further, compression after contact increases stress in the mesh ring 40. The reaction to this compression is that the mesh ring 40 increases n density thereby increasing its rigidity. The product of this compression is an increased non-extrusion device (i.e. higher operating pressures) and improved centralizer (which is rigidity dependent). The groove 25 in the elastomer seal body 35 has a further purpose beyond hinging the seal array 7 in the annulus 155. Friction drag is also reduced at the surface contact between the well tool 125 and the elastomer seal body 35. The groove 25 eliminates unnecessary elastomer surface contact which would divert some compressive forces to create friction drag.

Dimensions of the annulus 155 vary based on eccentricity of the Well tool 125 to the casing 120. Maximum eccentricity denotes contact of the well tool 125 to the casing inside surface 135. Such eccentricity may create an annulus dimension different from the mean annulus dimension. The non-extrusion rings 40 are sized to contact the casing wall 135 upon seal body 35 energizing. Because of the increased rigidity of the non-extrusion ring 40, or ring 100, over the prior art rings, contact by ring 40 or ring 100 with the casing wall 135 causes the well tool 125 to centralize within the casing 135. By this action the annulus 155 becomes uniform along the circumference of the well tool 125.

Figure 8:
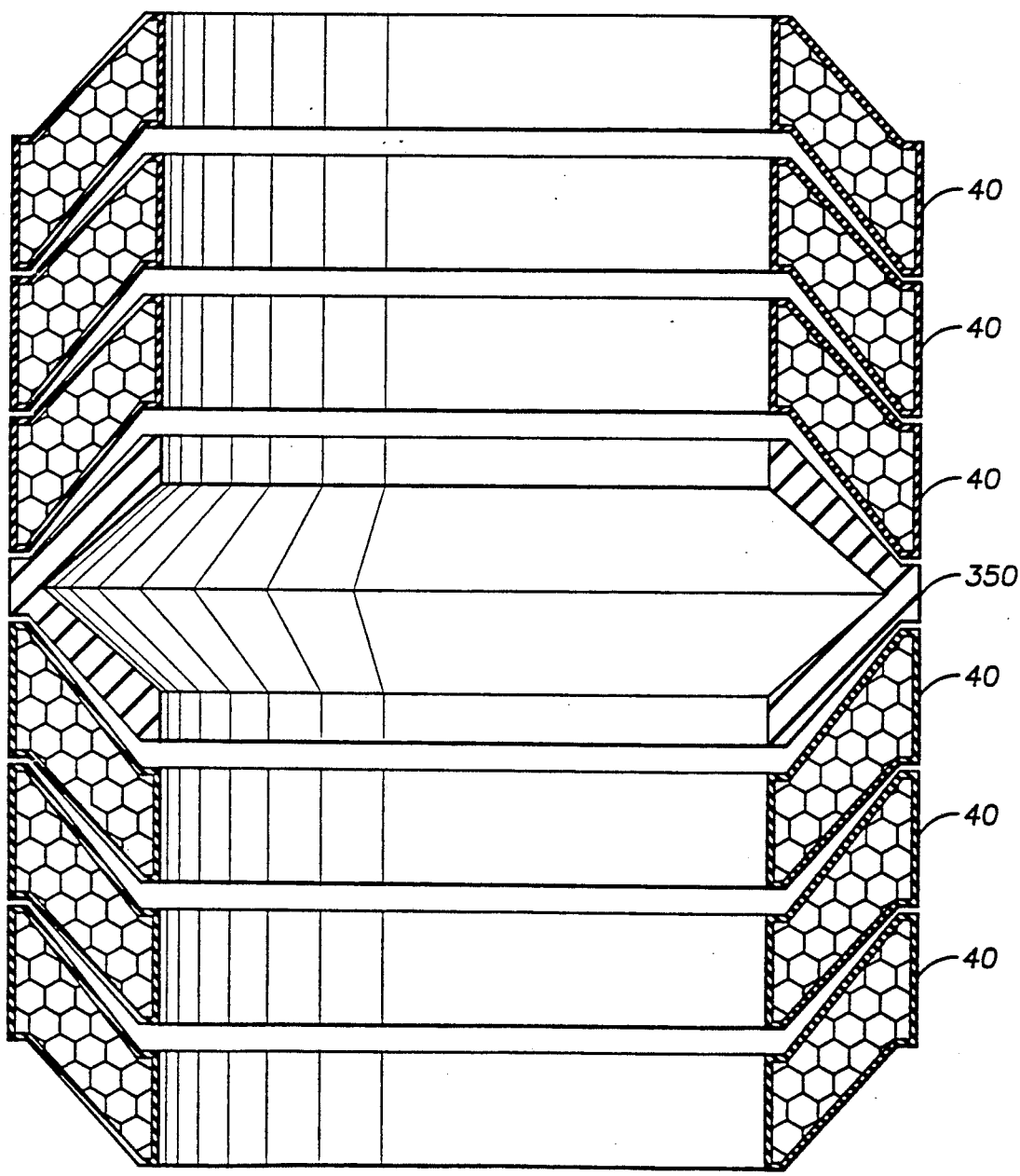
FIG. 8 is a similar view to FIG. 6 without depicting the environment but showing multiple sets of non-extrusion rings.
Figure 9:
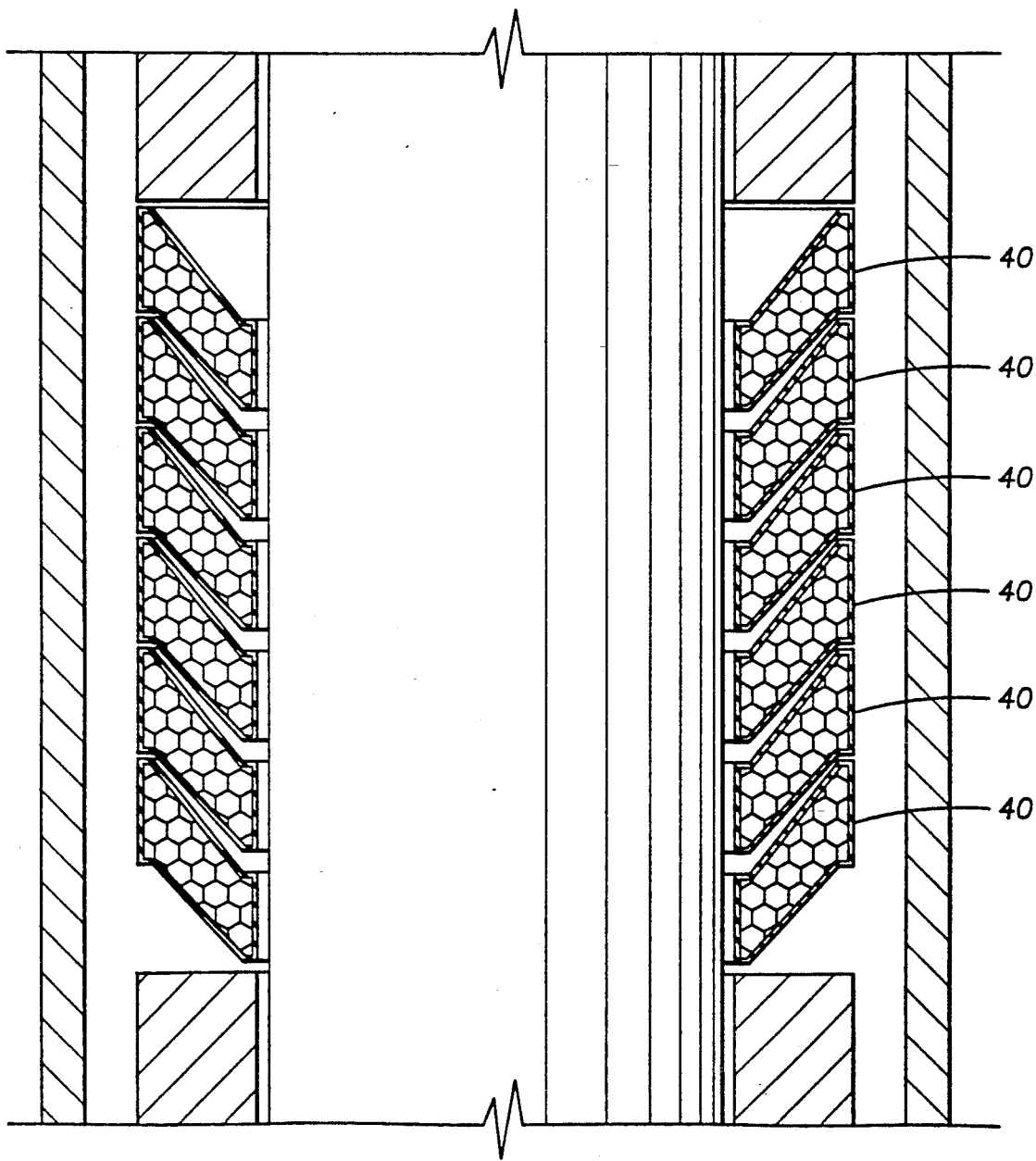
FIG. 9 is a partial view, partly in cross-section, of a seal array showing as seal rings only the rings of the sort shown in FIG. 2.

As shown in FIG. 8, a set of rings 40 may be used as a seal array with a ring 350 of smaller dimensions than ring 35, but otherwise of substantially the same design, with the ring 40 supplying a part of the primary sealing as well as the anti-extrusion sealing. Such rings may be used as an alternative for seal array 7 in applications such as FIG. 6 and 7. Another alternate configurations is shown in FIG. 9, wherein only a set of rings 40 are used for primary sealing, much as a "chevron" type sealing system would be used, without a ring 35 or 350.

It will be understood that the various configurations and the materials of construction of the seals and packings disclosed herein are virtually endless. Accordingly, the configurations and materials of construction depicted and discussed above are merely illustrative and are not intended in any way to limit the scope of the invention either with regard as to the specific configuration of seal or packing or to the type of packing or material construction employed.

What is claimed is:

1. A seal array, comprising:
    an anti-extrusion ring, said ring comprising mesh wire core and having an outer coating, said ring having
    (1) an upper surface adapted to receive compressive force,
    (2) a lower surface adapted to transmit compressive force,
    (3) an outer surface including a first anti-extrusion sealing surface
    (4) means for rotating said anti-extrusion ring to increase the diameter of said outer surface, and
    (5) an inner second anti-extrusion sealing surface;
    a seal body ring, said seal body ring being of a deformable material, said seal body ring having
    (1) an upper surface corresponding in shape to said lower surface of said anti-extrusion ring,
    (2) a fluid sealing outer surface,
    (3) an interior including two legs, each of said legs having an inner fluid sealing surface, said legs having a groove therebetween, and
    (4) a lower surface;
    said anti-extrusion ring being adjacent said seal body ring with said lower surface of said anti-extrusion ring adjacent to said upper surface of said seal body ring.

2. The seal array of claim 1 wherein there is included a second anti-extrusion ring of the same materials and coating, said second anti-extrusion ring having:
    (1) an upper surface corresponding in shape to said lower surface of said seal body ring and adapted to transmit compressive force,
    (2) a lower surface adapted to receive compressive force,
    (3) an outer surface having a third anti-extrusion sealing surface
    (4) means for rotating said second anti-extrusion ring to increase the diameter of said third anti-extrusion surface, and
    (5) an inner fourth anti-extrusion sealing surface;
    said second anti-extrusion ring being adjacent said seal body ring with said upper surface of said second anti-extrusion ring adjacent to said lower surface of said seal body ring.

3. The seal array of claim 1, wherein said legs are dimensioned to move toward each other upon the application of compressive force on said upper surface of said anti-extrusion ring.

4. The seal array of claim 1, wherein said anti-extrusion ring has a density of substantially fifty percent of the material of its composition.

5. The seal array of claim 4, wherein said mesh wire is comprised of metal interlocking loops.

6. The seal array of claim 1, wherein said anti-extrusion ring has a density of between forty-eight and fifty-two percent of the material of its composition.

7. A seal array of claim 1, wherein said seal body ring deformable material is comprised of radially expandable homogeneous elastomer.

8. The seal array of claim 1, wherein said non-extrusion ring is sufficiently rigid to be a centralizer.

9. The seal array of claim 1, wherein said sealing surfaces seals fluid flow.

10. The seal array of claim 1, wherein said is of sufficient dimension to impart rigidity on said anti-extrusion ring greater than the rigidity of said mesh wire and the rigidity of said resilient material separately.

11. The seal array of claim 1, wherein said coating is also fluid resistant.

12. The seal array of claim 11, wherein said coating is an elastomer.

13. The seal array of claim 11, wherein said coating is a plastic.

14. The seal array of claim 11, wherein said coating is a malleable metal.

15. The seal array of claim 1, wherein said anti-extrusion ring includes a hinge point of restricted cross-sectional thickness.

16. The seal array of claim 1, wherein said lower surface is a curvilinear surface and is adapted to transmit compressive forces to said seal body ring to impart uniform stresses throughout said seal body ring.

17. The seal array of claim 16, wherein said seal body ring is compressed sufficiently to substantially inhibit gas permeation into said seal body ring.

18. A packer for use in sealingly engaged the side walls of an annular area, comprising:
    a sealing ring having means for activating sealing against each of the side walls upon compression;

a non-extrusion ring on either side of said sealing ring, each of said non-extrusion rings having
  (1) a mesh interior and a resilient outer coating,
  (2) activation means for activating sealing engagement of a portion of the surface of said anti-extrusion ring with the side walls upon compression of said sealing ring, and
  (3) receiving means for receiving compression and uniformly transmitting compression to said sealing ring; and
compression means for applying compression to said receiving means.

19. The packer of claim 18, wherein the side walls include the outer wall of a well tool and the inner wall of a pipe and wherein said sealing ring is comprised of a deformable material and includes a gap facing the outer wall of the well tool.

20. The packer of claim 19, wherein said activation means includes a cantilevered sealing surface juxtaposed with the inner wall of the pipe.

21. The packer of claim 20, wherein said sealing ring includes a first surface expandable upon compression of said sealing ring and said activation means include a second surface forming a portion of said cantilevered sealing surface adjacent to said first surface and responsive to said expansion of said first surface.

22. The packer of claim 21, wherein said cantilevered sealing surface includes a hinge position on the portion of said surface adjacent to said first surface.

23. The packer of claim 19, wherein said activation means initiates sealing engagement of said non-extrusion ring with the inner wall of the pipe before sealing engagement of said non-extrusion ring with the outer wall of the well tool.

24. The packer of claim 23, wherein said non-extrusion ring includes reduction means for reducing friction forces imparted by the outer wall of the well engaging with said non-extrusion ring.

25. The packer of claim 24, wherein said sealing ring includes second reduction means for reducing friction forces imparted by the outer wall of well tool engagement with said non-extrusion ring.

26. The packer of claim 19, wherein said non-extrusion ring, upon activating sealing against the inner wall of the pipe and the outer wall of the well tool, increases in density upon further increase of compression.

27. The packer of claim 26, wherein said non-extrusion ring increases in rigidity upon increasing in density.

28. The packer of claim 19, wherein said receiving means transmits compression to said sealing ring substantially uniformly throughout engagement of said non-extrusion ring and said sealing ring.

29. A packer for use in sealingly engaging the outer side wall of a well tool and the inner side of a pipe in which the well tool is received, comprising:
a sealing ring, said sealing ring having means responsive to compressive force for substantially simultaneously sealingly engaging the outer side and the inner side;
a set of mesh rings having an outer coating bounding said sealing ring and having
  (1) centralizing means responsive to compressive force for centering the well tool in the pipe, and
  (2) compressive means for receiving compressive force and transmitting compressive force to said sealing ring; and side walls upon compression of said sealing ring, and
means for applying compressive force to said compressive means.

30. The packer of claim 29, wherein the density of said mesh rings is in a range from forty-eight to fifty-two percent of a solid ring of the same material.

31. The packer of claim 30, wherein each of said mesh rings has metal mesh.

32. The packer of claim 31, wherein each of said metal mesh is comprised of interlocking metal loops.

33. The packer of claim 32, wherein each of said mesh rings is coated with an elastomer.

34. The packer of claim 32, wherein each of said metal mesh rings is coated with a plastic.

35. The packer of claim 32, wherein each of said metal mesh rings is coated with a malleable metal.

36. A seal system, consisting of:
a seal ring;
one mesh ring located on each side of said seal ring, each of said mesh rings being coated on the outside with a flexible material and having means for uniformly increasing the density of said mesh ring upon compression into firm sealing contact.

37. A seal system for use with an inner and an outer external surface, comprising:
a set of mesh rings having an inner and outer radial surface having an initial density less than the density of the material of said rings,
each of said metal mesh rings being coated by a flexible material;
said mesh rings having means for making contact between such inner radial surface and the inner external surface after contact between said outer radial surfaces and the outer external surfaces.

38. The seal system of claim 37, wherein said mesh of said mesh rings are of metal and include a set of interlocking loops.

* * * * *